United States Patent
Chen

(10) Patent No.: US 12,381,631 B2
(45) Date of Patent: Aug. 5, 2025

(54) COHERENT RECEIVER WITH POLARIZATION DIVERSITY CLOCK DETECTION

(71) Applicant: Marvell Asia Pte Ltd, Singapore (SG)

(72) Inventor: Chen Chen, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 252 days.

(21) Appl. No.: 18/366,695

(22) Filed: Aug. 8, 2023

(65) Prior Publication Data

US 2024/0063917 A1 Feb. 22, 2024

Related U.S. Application Data

(60) Provisional application No. 63/398,893, filed on Aug. 18, 2022.

(51) Int. Cl.
*H04B 10/06* (2006.01)
*H04B 10/61* (2013.01)
*H04L 7/00* (2006.01)

(52) U.S. Cl.
CPC ....... *H04B 10/6162* (2013.01); *H04L 7/0075* (2013.01)

(58) Field of Classification Search
CPC .. H04B 10/61; H04B 10/616; H04B 10/6161; H04B 10/6162; H04B 10/6163; H04B 10/6164; H04B 10/6165; H04B 10/614; H04B 10/40; H04B 10/0795; H04B 10/2507; H04L 7/0075

(Continued)

(56) References Cited

U.S. PATENT DOCUMENTS 7,627,252 B2 * 12/2009 Sun ............... H04B 10/508
398/155
8,774,644 B2 7/2014 Sun et al.
(Continued)

FOREIGN PATENT DOCUMENTS

WO 2011100867 A1 8/2011

OTHER PUBLICATIONS

Sun et al., "A novel dispersion and PMD tolerant clock phase detector for coherent transmission systems", Optical Society of America, IEEE Xplore, pp. 1-3, year 2011.

(Continued)

*Primary Examiner* — Hanh Phan
(74) *Attorney, Agent, or Firm* — Meitar Patents Ltd.; Daniel Kligler

(57) ABSTRACT

A receiver includes an optical front-end and digital circuitry. The optical front-end is configured to receive an optical signal including first and second optical signal components having first and second polarizations and modulated with symbols at a symbol rate. The digital circuitry is configured to derive first and second digital signals representing the first and second optical signal components having the first and second polarizations. The digital circuitry includes a clock detector configured to calculate correlation terms, the correlation terms being calculated in a frequency-domain with a frequency offset commensurate with the symbol rate. The clock detector is configured to recover a clock signal of the symbols by (i) summing selected pairs of the correlation terms, and (ii) calculating or estimating a sum-of-squares of the summed pairs.

18 Claims, 4 Drawing Sheets

(58) Field of Classification Search
USPC ....... 398/202, 203, 204, 205, 207, 208, 209,
398/213, 214, 154, 155, 158, 159, 147,
398/135, 136, 137, 33, 38, 183, 188, 184,
398/152, 65, 25, 26, 27
See application file for complete search history.

(56) References Cited

U.S. PATENT DOCUMENTS

| | | |
|---|---|---|
| 9,225,433 B1 | 12/2015 | Hueda et al. |
| 2007/0092260 A1* | 4/2007 | Bontu ................... H04J 3/0608 |
| | | 398/152 |
| 2012/0219302 A1* | 8/2012 | Sun ........................ H04L 7/027 |
| | | 398/208 |
| 2017/0302385 A1 | 10/2017 | Hueda et al. |

OTHER PUBLICATIONS

Soriano, "Chromatic dispersion estimation in digital coherent receivers", Journal of Lightwave Technology, vol. 29, No. 11, pp. 1627-1637, Jun. 1, 2011.
EP Application # EP 23191074.6 Search Report dated Dec. 22, 2023.

* cited by examiner

COHERENT RECEIVER WITH POLARIZATION DIVERSITY CLOCK DETECTION

CROSS-REFERENCE TO RELATED APPLICATIONS

This application claims the benefit of U.S. Provisional Patent Application 63/398,893, filed Aug. 18, 2022, whose disclosure is incorporated herein by reference.

FIELD OF THE DISCLOSURE

The present disclosure relates generally to optical communication, and particularly to methods and systems for clock detection in electro-optical receivers.

BACKGROUND

An electro-optical receiver typically receives and demodulates an optical signal comprising a sequence of modulated symbols. In a coherent receiver, which demodulates the phase, or both the amplitude and the phase, of the received signal, a fundamental requirement is to reconstruct a clock signal that defines the timing of the symbol sequence. This task is referred to herein as "clock tone detection" or "clock recovery." Clock tone detection is important, for example, for synchronizing with the transmitter in order to demodulate the received signal correctly, and for estimating Chromatic Dispersion (CD).

The description above is presented as a general overview of related art in this field and should not be construed as an admission that any of the information it contains constitutes prior art against the present patent application.

SUMMARY

An embodiment that is described herein provides a receiver including an optical front-end and digital circuitry. The optical front-end is configured to receive an optical signal including a first optical signal component having a first polarization and a second optical signal component having a second polarization, different from the first polarization, the first optical signal component and the second optical signal component being modulated with symbols at a symbol rate. The digital circuitry is configured to derive a first digital signal representing the first optical signal component having the first polarization, and to derive a second digital signal representing the second optical signal component having the second polarization. The digital circuitry includes a clock detector configured to calculate correlation terms comprising (i) a first autocorrelation of the first digital signal, (ii) a second autocorrelation of the second digital signal, (iii) a first cross-correlation between the first digital signal and the second digital signal, and (iv) a second cross-correlation between the second digital signal and the first digital signal, the correlation terms being calculated in a frequency-domain with a frequency offset commensurate with the symbol rate. The clock detector is configured to recover a clock signal of the symbols by (i) summing selected pairs of the correlation terms, and (ii) calculating or estimating a sum-of-squares of the summed pairs.

In some embodiments, by estimating the sum of squares, the clock detector is configured to prevent the recovered clock signal from diminishing to zero for any combination of Polarization Mode Dispersion (PMD), polarization rotation and Differential Group Delay (DGD) affecting the optical signal.

In some embodiments, the clock detector is configured to recover the clock signal by averaging the sum-of-squares over a plurality of frequencies. In an embodiment, the clock detector is configured to approximate squares of the summed pairs by calculating absolute-values of the summed pairs. In another embodiment, the clock detector is configured to approximate the sum-of-squares by (i) calculating respective absolute-values of the summed pairs of the correlation terms, and (ii) taking a maximum of the absolute-values.

In some embodiments, in recovering the clock signal, the clock detector is configured to recover an amplitude of the clock signal by summing the sum-of-squares over a plurality of frequencies. In an example embodiment, the clock detector is configured to average each of the correlation terms over time, per frequency among the plurality of frequencies, then calculate the sum-of-squares per frequency based on the averaged correlation terms, and then calculate the amplitude of the clock signal based on the sum-of-squares calculated per frequency. In an alternative embodiment, the clock detector is configured to sum each of the correlation terms over the plurality of frequencies, then calculate the sum-of-squares based on the correlation terms summed over the frequencies, and then average multiple sums-of-squares to produce the amplitude of the clock signal.

In a disclosed embodiment, the clock detector is further configured to recover a phase of the clock signal by taking an imaginary part of the calculated or estimated sum-of-squares.

There is additionally provided, in accordance with an embodiment that is described herein, a method for clock recovery. The method includes receiving an optical signal including a first optical signal component having a first polarization and a second optical signal component having a second polarization, different from the first polarization, the first optical signal component and the second optical signal component being modulated with symbols at a symbol rate. A first digital signal is derived, representing the first optical signal component having the first polarization, and a second digital signal is derived, representing the second optical signal component having the second polarization. Correlation terms are calculated, including (i) a first autocorrelation of the first digital signal, (ii) a second autocorrelation of the second digital signal, (iii) a first cross-correlation between the first digital signal and the second digital signal, and (iv) a second cross-correlation between the second digital signal and the first digital signal, the correlation terms being calculated in a frequency-domain with a frequency offset commensurate with the symbol rate. A clock signal of the symbols is recovered by (i) summing selected pairs of the correlation terms, and (ii) calculating or estimating a sum-of-squares of the summed pairs.

The present disclosure will be more fully understood from the following detailed description of the embodiments thereof, taken together with the drawings in which:

DETAILED DESCRIPTION OF EMBODIMENTS

Embodiments that are described herein provide electro-optical receivers having improved clock tone detection, and associated methods. As will be explained herein, the disclosed techniques apply polarization diversity to detect the clock tone with high resilience against impairments that affect the received optical signal, such as Polarization Mode Diversity (PMD) and Differential Group Delay (DGD).

The disclosed techniques can be used in any suitable system or environment involving reception of optical signals. Example applications include receivers of long-haul optical links, optical interconnects in data centers, and many others.

Figure 1:
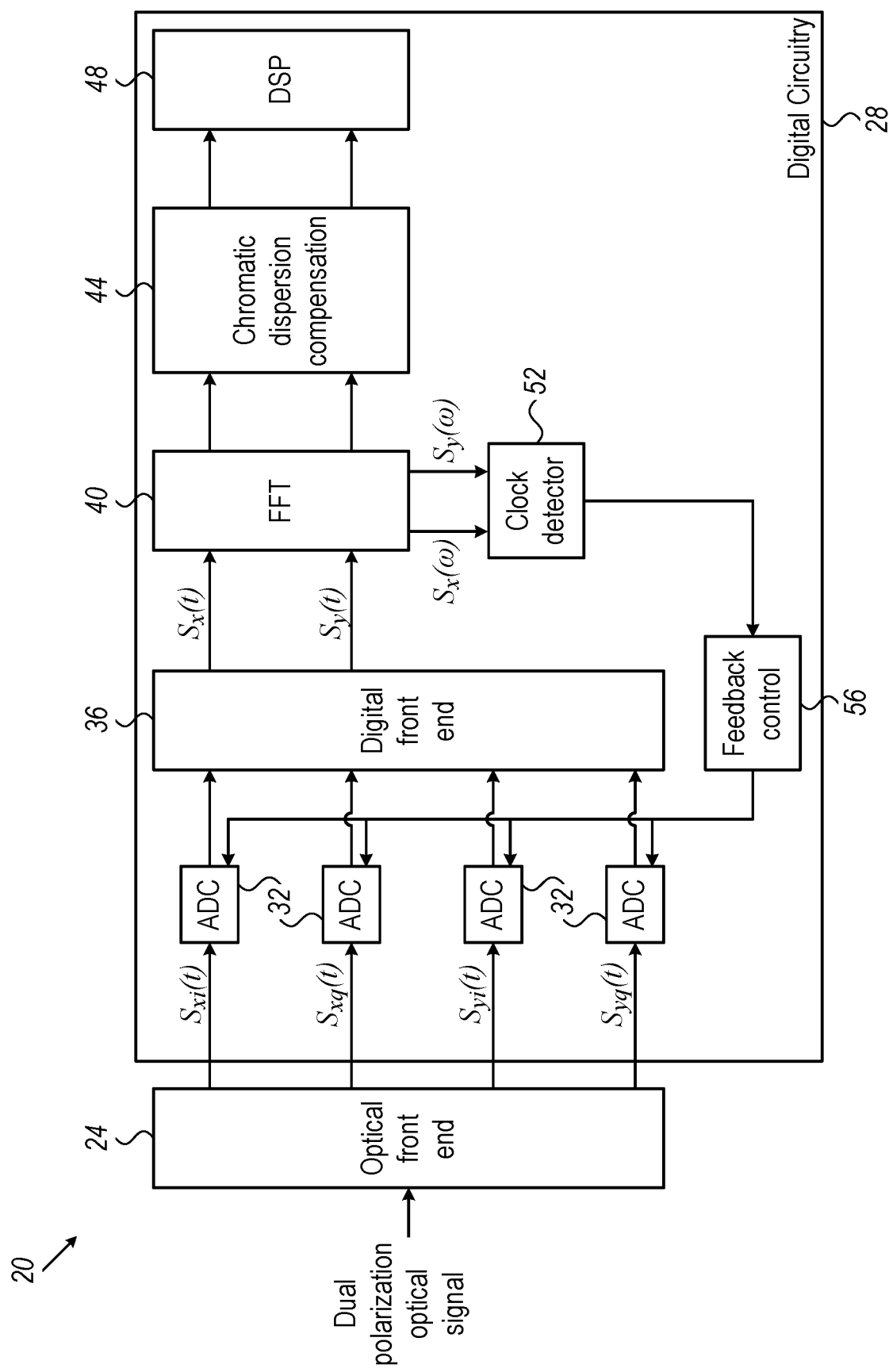
FIG. 1 is a block diagram that schematically illustrates a coherent electro-optical receiver, in accordance with an embodiment that is described herein.

FIG. 1 is a block diagram that schematically illustrates a coherent electro-optical receiver 20, in accordance with an embodiment that is described herein. Receiver 20 receives an optical signal from a transmitter, e.g., over an optical fiber. The optical signal is a dual-polarization signal, having two polarizations denoted x and y. The optical signal is modulated with data using a suitable modulation scheme that utilizes both polarizations, e.g., Quadrature Amplitude Modulation (QAM). The optical signal is coherent, in the sense that at least some of the information conveyed by the signal is embedded in the signal phase. In the present example, receiver 20 comprises an optical front end 24 and digital circuitry 28. Typically, optical front end 24 performs optical and analog functions of the receiver, whereas digital circuitry 28 performs mixed-signal and digital functions of the receiver. Alternatively, however, any other suitable task partitioning can be used.

Optical front end 24 of receiver 20 receives the optical signal from the optical fiber, down-converts the signal to baseband, splits the baseband signal into the individual polarizations, and then performs complex (In-phase/Quadrature—I/Q) signal detection on each polarization. In the present example, optical front end 24 outputs four analog baseband electrical signals denoted $S_{xi}(t)$, $S_{xq}(t)$, $S_{yi}(t)$ and $S_{yq}(t)$. Signals $S_{xi}(t)$ and $S_{xq}(t)$ are the In-phase (I) and Quadrature (Q) components of the x polarization, respectively. Signals $S_{yi}(t)$ and $S_{yq}(t)$ are the I and Q components of the y polarization, respectively.

In a typical implementation, optical front end 24 comprises a Local Oscillator (LO) laser, a polarization beam splitter, an optical hybrid, photodiodes and Trans-Impedance Amplifiers (TIAs). The internal structure of optical front end 24 is not detailed in the figure, for the sake of clarity. In alternative embodiments, any other suitable configuration can be used.

Digital circuitry 28 in the embodiment of FIG. 1 comprises four Analog-to-Digital Converters (ADCs) 32, a digital front end 36, a Fast Fourier Transform (FFT) circuit 40, a Chromatic Dispersion (CD) compensation circuit 44, a Digital Signal Processor (DSP) 48, a clock detector 52 and a feedback control circuit 56.

In an embodiment, ADCs 32 digitize (sample) the four signals $S_{xi}(t)$, $S_{xq}(t)$, $S_{yi}(t)$ and $S_{yq}(t)$ to produce four corresponding digital baseband signals. Digital front end 36 removes timing skews among the four digital signals, equalizes the amplitudes of the four digital signals, and/or performs any other suitable digital pre-processing. In the present example digital front end 36 outputs two signals denoted $S_x(t)$ and $S_y(t)$, which are respective digital time-domain representations of the x and y polarizations of the received optical signal.

In an embodiment, FFT circuit 40 transforms signals $S_x(t)$ and $S_y(t)$ from the time domain into the frequency domain, producing two digital frequency-domain signals denoted $S_x(\omega)$ and $S_y(\omega)$. CD compensation circuit 44 compensates for at least some of the chromatic dispersion in $S_x(\omega)$ and $S_y(\omega)$, originating from the received optical signal. DSP 48 demodulates signals $S_x(\omega)$ and $S_y(\omega)$ and outputs the demodulated data.

In disclosed embodiments, clock detector 52 is configured to reconstruct a clock tone from signals $S_x(\omega)$ and $S_y(\omega)$. As will be explained and demonstrated below, clock detector 52 uses polarization diversity techniques for detecting the clock tone reliably irrespective of any combination of Polarization Mode Dispersion (PMD), polarization rotation and/or Differential Group Delay (DGD) affecting the received optical signal. Example clock detector implementations are described further below with reference to FIGS. 6 and 7.

In various embodiments, the detected clock tone can be used by receiver 20 in various ways and for various purposes. In the example embodiment of FIG. 1, digital circuitry 56 further comprises a feedback control circuit 56, which adjusts the sampling phases of ADCs 32 based on the detected clock tone. In an example embodiment, feedback control circuit comprises a loop filter (e.g., a Proportional Integral Derivative—PID) that filters the detected clock tone. The output of the loop filter controls a Voltage Controlled Oscillator (VCO), which in turn controls the sampling phases of ADCs 32. In alternative embodiments, feedback control circuit 56 can be implemented in any other suitable manner. Additionally, or alternatively, the detected clock tone can be used for any other suitable purpose, e.g., to aid in estimating the Chromatic Distortion (CD) as an input to CD compensation circuit 44.

Figure 2:
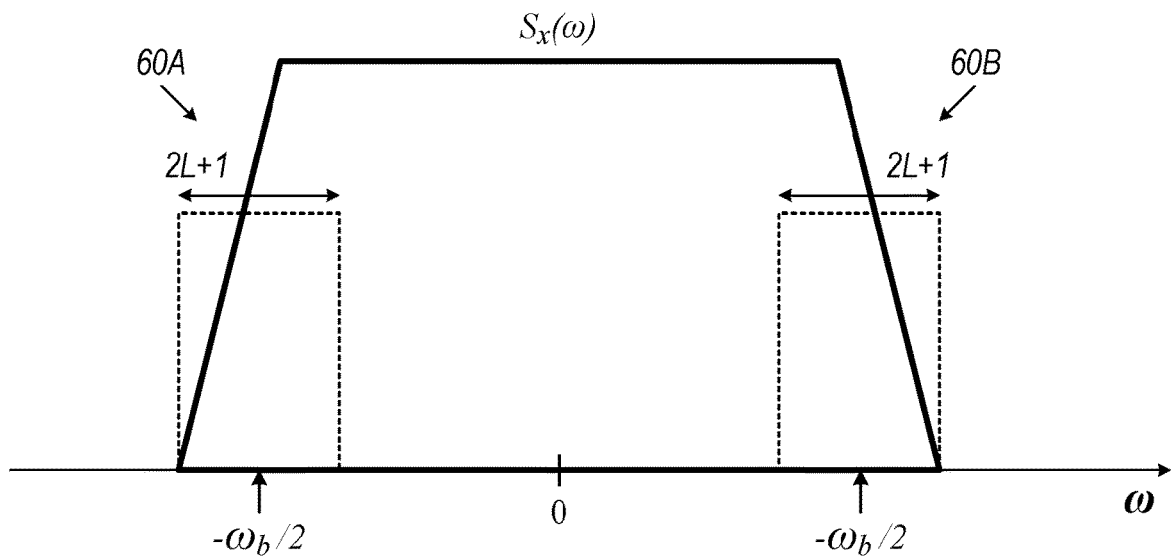
FIG. 2 is a diagram that schematically illustrates a frequency-domain representation of a signal received by the receiver of FIG. 1, in accordance with an embodiment that is described herein.

FIG. 2 is a diagram that schematically illustrates a frequency-domain representation (spectrum) of a signal received by receiver 20 of FIG. 1, in accordance with an embodiment that is described herein. Without loss of generality the figure illustrates the spectrum of signal $S_x(\omega)$. The spectrum of $S_y(\omega)$ is similar.

It can be shown that the clock tone of such a signal can be estimated in the frequency domain by correlating pairs of frequency-domain samples of the signal, wherein the samples in each pair are separated from one another by a frequency offset equal to the symbol rate $\omega_b$. The example of FIG. 2 shows a first set 60A of 2 L+1 samples centered about $\omega=-\omega_b/2$, and a second set 60B of 2 L+1 samples centered about $\omega=\omega_b/2$. The samples of each pair (one sample from set 60A and a corresponding sample from set 60B) are separated by $\omega_b$. A sum of correlations between pairs of frequency-domain samples having this spacing can be used as an estimate of the clock tone. As will be shown below, however, such an estimate is sensitive to signal impairments such as PMD, polarization rotation and DGD.

Let $S_{x0}(\omega)$ and $S_{y0}(\omega)$ denote the two polarizations of the optical signal transmitted by the transmitter, i.e., before any PMD, polarization rotation and DGD occur. Let $\theta$, $\varphi$ and $\tau$ denote the polarization rotation angle, polarization phase and DGD between the two polarizations at receiver 20, respectively. With this notation, the signals $S_x(\omega)$ and $S_y(\omega)$ at the input of clock detector 52 are given by:

$$\begin{bmatrix} S_x(\omega) \\ S_y(\omega) \end{bmatrix} = \begin{bmatrix} \cos\theta e^{j\varphi} & \sin\theta \\ -\sin\theta & \cos\theta e^{-j\varphi} \end{bmatrix} \begin{bmatrix} e^{j\omega\frac{\tau}{2}} & 0 \\ 0 & -e^{j\omega\frac{\tau}{2}} \end{bmatrix} \begin{bmatrix} S_{x0}(\omega) \\ S_{y0}(\omega) \end{bmatrix} = \begin{bmatrix} \cos\theta e^{j\varphi}e^{j\omega\frac{\tau}{2}}S_{x0}(\omega) + \sin\theta e^{-j\omega\frac{\tau}{2}}S_{y0}(\omega) \\ -\sin\theta e^{j\omega\frac{\tau}{2}}S_{x0}(\omega) + \cos\theta e^{-j\omega\frac{\tau}{2}}S_{y0}(\omega) \end{bmatrix}$$

Equation 1

For first-order PMD, $\theta$, $\varphi$ and $\tau$ are constant over frequency. When considering higher-order PMD, $\theta$, $\varphi$ and $\tau$ may depend on frequency $\omega$ within the signal bandwidth. The frequency-domain representation used herein enables accounting for any PMD order.

As noted above, the clock tone can be estimated from the X polarization component of the signal by calculating the following sum of correlations:

$$C_{xx0} = \left| \sum_{\omega=-\omega_b/2-L}^{-\omega_b/2+L} S_{x0}(\omega)S_{x0}^*(\omega+\omega_b) \right|$$

Equation 2

Similarly, the clock tone can be estimated from the y polarization component of the signal by calculating:

$$C_{yy0} = \left| \sum_{\omega=-\omega_b/2-L}^{-\omega_b/2+L} S_{y0}(\omega)S_{y0}^*(\omega+\omega_b) \right|$$

Equation 3

Both Equation 1 and Equation 2 do not include the effects of distortion mechanisms such as polarization rotation, PMD and DGD. After introducing polarization rotation, PMD and DGD according to Equation 1, the clock tone estimated from the X polarization is given by:

$$C_{xx}(\omega) =$$

Equation 4

$$\langle S_x(\omega)S_x^*(\omega+\omega_b) \rangle = \cos^2\theta e^{-j\omega_b\frac{\tau}{2}}C_{xx0}(\omega) + \sin^2\theta e^{j\omega_b\frac{\tau}{2}}C_{yy0}(\omega)$$

wherein the $\langle \ldots \rangle$ brackets denote statistical expectation, or a time average. With sufficient averaging over time, the terms $\langle S_{x0}(\omega)S_{x0}^*(\omega+\omega b) \rangle$ and $\langle S_{y0}(\omega)S_{y0}^*(\omega+\omega_b) \rangle$ converge to constant values represented by $C_{xx0}(\omega)$ and $C_{yy0}(\omega)$, respectively. Equation 4 also assumes that $S_x$ and $S_y$ are statistically mutually independent, so that the cross-correlation between them is zero.

In practice, the signals in the x and y polarizations have the same energy, and therefore $C_{xx0}(\omega) = C_{yy0}(\omega)$. Under this condition Equation 4 becomes:

$$C_{xx}(\omega) = [\cos(\pi f_b \tau) - j \cos 2\theta \sin(\pi f_b \tau)]C_{xx0}(\omega)$$

Equation 5:

wherein $f_b = \omega/2\pi$.

Analyzing the clock tone estimator of Equation 5 reveals that the amplitude of the estimated clock tone would diminish to zero when the DGD approaches half the symbol rate (i.e., when $\tau$ approaches $1/(2f_b)$) and the polarization rotation angle $\theta$ approaches an odd integer multiple of 45 degrees. In practice, the clock tone may also diminish under additional combinations of DGD and PMD, e.g., because Equation 5 assumed only first-order PMD.

A clock tone that diminishes to zero can have catastrophic effects on the receiver performance, e.g., deviation from the optimal signal sampling points or even complete loss of synchronization with the transmitter. When the recovered clock tone is used for CD estimation, a diminishing clock tone may cause large estimation errors, possibly leading to failure in acquiring the signal.

In view of the foregoing, in some embodiments clock detector 52 uses a new, novel estimator for the clock tone, an estimator that does not diminish to zero under any combination of PMD and/or DGD.

Consider a pair of frequencies $\omega$ and $\omega+\omega_b$. Without loss of generality, the two frequencies can be assumed to differ in polarization rotation angle ($\theta'$ vs. $\theta$), polarization phase ($\varphi'$ vs. $\varphi$) and DGD ($\tau+\Delta\tau$ vs. $\tau$). The frequency-domain samples of the x polarization signal at these two frequencies can thus be written as:

$$S_x(\omega) = \cos\theta e^{j\varphi} e^{j\omega\frac{\tau+\Delta\tau}{2}} S_{x0}(\omega) + \sin\theta e^{-j\omega\frac{\tau+\Delta\tau}{2}} S_{y0}(\omega)$$

Equation 6

$$S_x(\omega+\omega_b) =$$

Equation 7

$$\cos\theta' e^{j\varphi'} e^{j(\omega+\omega_b)\frac{\tau}{2}} S_{x0}(\omega+\omega_b) + \sin\theta' e^{-j(\omega+\omega_b)\frac{\tau}{2}} S_{y0}(\omega+\omega_b)$$

The clock tone estimated from this pair of samples is given by the following correlation term:

$$C_{xx}(\omega) =$$

Equation 8

$$\langle S_x(\omega)S_x^*(\omega+\omega_b) \rangle = \cos\theta\cos\theta' e^{-j\left(\omega_b\frac{\tau}{2} - \omega\frac{\Delta\tau}{2}\right)} e^{j(\varphi-\varphi')} C_{xx0}(\omega) + \sin\theta\sin\theta' e^{j\left(\omega_b\frac{\tau}{2} - \omega\frac{\Delta\tau}{2}\right)} C_{yy0}(\omega)$$

In a similar manner, it is possible to estimate the clock tone using any of the following correlation terms:

$$C_{yy}(\omega) = \langle S_y(\omega)S_y^*(\omega+\omega_b) \rangle$$   Equation 9:

$$C_{yy}(\omega) = \langle S_x(\omega)S_y^*(\omega+\omega_b) \rangle$$   Equation 10:

$$C_{yy}(\omega) = \langle S_y(\omega)S_x^*(\omega+\omega_b) \rangle$$   Equation 11:

The estimator of Equation 8 uses autocorrelation (also referred to as intra-polarization correlation) of the x polarization signal; The estimator of Equation 8 uses autocorrelation of the y polarization signal; The estimator of Equation 10 uses cross-correlation (also referred to as inter-polarization correlation) between the x polarization signal and the y polarization signal; The estimator of Equation 11 uses cross-correlation between the y polarization signal and the x polarization signal. In all these correlation terms the frequency offset is $\omega_b$.

Assuming the x and y polarization signal have the same energy, we can normalize $C_{xx0}(\omega) = C_{yy0}(\omega) = 1$ without loss of generality. The autocorrelation (intra-polarization correlation) terms of Equations 8 and 9 and the cross-correlation (inter-polarization correlation) terms of Equations 10 and 11 can be expressed as:

$$C_{xx}(\omega) = \left[\cos(\theta-\theta')\cos\left(\omega_b\frac{\tau}{2} - \omega\frac{\Delta\tau}{2} - \frac{\varphi-\varphi'}{2}\right) - j\cos(\theta+\theta')\sin\left(\omega_b\frac{\tau}{2} - \omega\frac{\Delta\tau}{2} - \frac{\varphi-\varphi'}{2}\right)\right] e^{j\frac{\varphi-\varphi'}{2}}$$

Equation 12

-continued $$C_{yy}(\omega) = \left[\cos(\theta - \theta')\cos\left(\omega_b\frac{\tau}{2} - \omega\frac{\Delta\tau}{2} - \frac{\varphi - \varphi'}{2}\right) - \right. \quad \text{Equation 13}$$

$$\left. j\cos(\theta + \theta')\sin\left(\omega_b\frac{\tau}{2} - \omega\frac{\Delta\tau}{2} - \frac{\varphi - \varphi'}{2}\right)\right]e^{j\frac{\varphi - \varphi'}{2}}$$

$$C_{xy}(\omega) = \left[\sin(\theta - \theta')\cos\left(\omega_b\frac{\tau}{2} - \omega\frac{\Delta\tau}{2} - \frac{\varphi - \varphi'}{2}\right) + \right. \quad \text{Equation 14}$$

$$\left. j\sin(\theta + \theta')\sin\left(\omega_b\frac{\tau}{2} - \omega\frac{\Delta\tau}{2} - \frac{\varphi - \varphi'}{2}\right)\right]e^{j\frac{\varphi + \varphi'}{2}}$$

$$C_{yx}(\omega) = \left[-\sin(\theta - \theta')\cos\left(\omega_b\frac{\tau}{2} - \omega\frac{\Delta\tau}{2} - \frac{\varphi - \varphi'}{2}\right) + \right. \quad \text{Equation 15}$$

$$\left. j\sin(\theta + \theta')\sin\left(\omega_b\frac{\tau}{2} - \omega\frac{\Delta\tau}{2} - \frac{\varphi - \varphi'}{2}\right)\right]e^{j\frac{\varphi + \varphi'}{2}}$$

Each of the estimators of Equations 12-15, if taken individually, depends on PMD and DGD and will diminish to zero in some combinations of these impairments. In some embodiments, clock detector 52 estimates the clock tone by diversity-combining the four correlation terms of Equations 12-15 ($C_{xx}(\omega)$, $C_{yy}(\omega)$, $C_{xy}(\omega)$ and $C_{yx}(\omega)$) in a way that renders the combination insensitive to PMD (of any order) and DGD. In some embodiments, clock detector 52 (i) sums selected pairs of the correlation terms, and (ii) calculates or estimating a sum-of-squares of the summed pairs. In an embodiment, the sum-of-squares of the summed pairs is denoted $C_{total}(\omega)$ and is given by:

$$C_{total}(\omega) = |C_{xx}(\omega) + C_{yy}(\omega)|^2 + |C_{xx}(\omega) - C_{yy}(\omega)|^2 + \quad \text{Equation 16}$$

$$|C_{xy}(\omega) + C_{yx}(\omega)|^2 + |C_{xy}(\omega) - C_{yx}(\omega)|^2 = C_{xx0}(\omega)$$

As discussed with regards to Equations 2 and 3 above, the clock tone can be estimated by calculating:

$$C_{sum} = \left|\sum_{\omega=-\omega_b/2-L}^{-\omega_b/2+L} C_{total}(\omega)\right| \quad \text{Equation 17}$$

Since $C_{total}(\omega)$ of Equation 16 has no dependence on PMD of any order and no dependence on polarization rotation, the estimated clock tone $C_{sum}$ of Equation 17, has no dependence on these impairments, as well.

Figure 3:
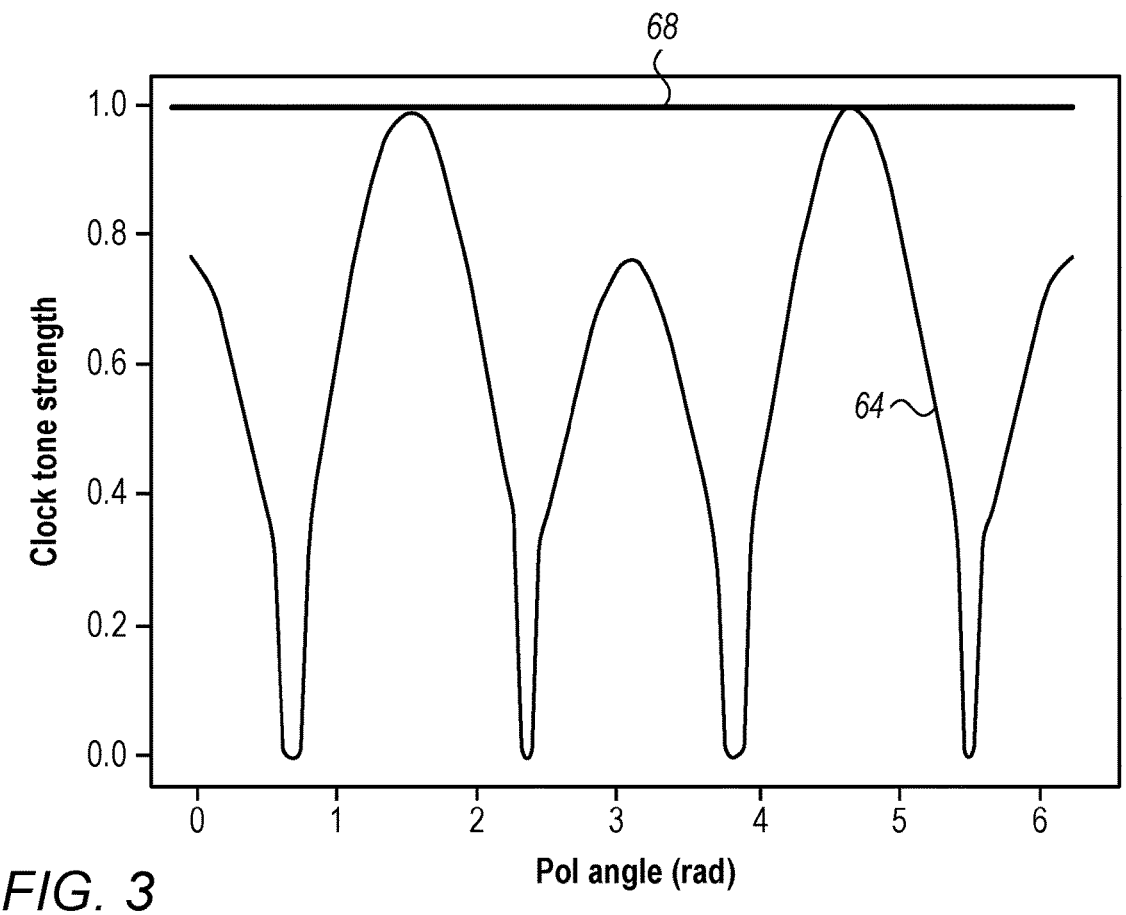
FIGS. 3 and 4 are graphs illustrating the dependence of clock tone strength on polarization angle for various clock tone estimation schemes, in accordance with embodiments that are described herein.

FIG. 3 is a graph illustrating the dependence of clock tone strength on polarization angle, in accordance with an embodiment that is described herein. The optical signal used in the present example was a dual-polarization signal having a symbol rate of 64.6 GHz. Each of the two polarizations was modulated using 16-QAM modulation. A DGD equal to half the symbol rate (7.7 psec) was introduced at the transmitter. A burst of 61440 samples of the dual-polarization signal was captured by the receiver ADC. To generate the graph, various polarization angles θ were applied numerically to the captured signal using a 2-by-2 Jones matrix (as in Equation 1).

A plot 64 shows the strength of the detected clock tone as a function of polarization angle, without the disclosed technique (e.g., using Equation 12 or Equation 13). As seen, the clock tone strength is far from being constant, and diminishes to zero at various polarization angles. A plot 68 shows the strength of the detected clock tone as a function of polarization angle when using the disclosed polarization diversity technique (e.g., using Equation 16). As seen, the clock strength is entirely independent of polarization angle and does not diminish to zero.

In some embodiments (e.g., in the above example of FIG. 3) clock detector 52 estimates the clock tone by evaluating Equation 16 exactly. This exact calculation includes evaluating Equation 16 2 L+1 times. Exact evaluation of Equation 16, however, is computationally expensive, especially since it includes four squaring operations per frequency. In some embodiments, instead of an accurate evaluation, clock detector 52 evaluates an approximation of Equation 16 that replaces the squares (of the summed pairs of correlation terms) with absolute-values:

$$C_{total}(\omega) = |C_{xx}(\omega) + C_{yy}(\omega)| + \quad \text{Equation 18}$$

$$|C_{xx}(\omega) - C_{yy}(\omega)| + |C_{xy}(\omega) + C_{yx}(\omega)| + |C_{xy}(\omega) - C_{yx}(\omega)|$$

In other embodiments, clock detector 52 evaluates another approximation of Equation 16 that replaces the summing operation with a maximum (maximum over the absolute-values of the summed pairs of correlation terms):

$$C_{total}(\omega) = \max(|C_{xx}(\omega) + C_{yy}(\omega)|, \quad \text{Equation 19}$$

$$|C_{xx}(\omega) - C_{yy}(\omega)|, |C_{xy}(\omega) + C_{yx}(\omega)|, |C_{xy}(\omega) - C_{yx}(\omega)|)$$

The approximations in Equations 18 and 19 require considerably less computational power than the exact calculation of Equation 16.

Figure 4:
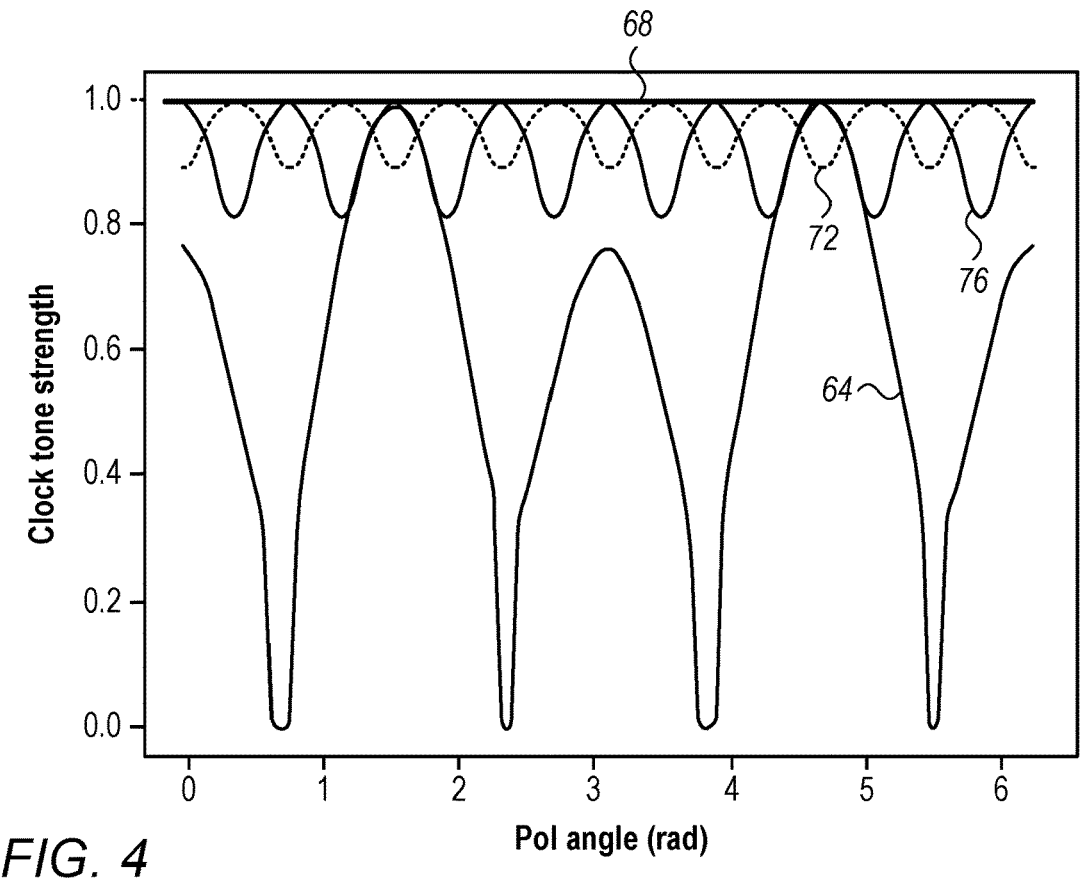

FIG. 4 is a graph illustrating a dependence of clock tone strength on polarization angle for various calculations or approximations of Equation 16, in accordance with an embodiment that is described herein. The signal properties in the present example are the same as in the example of FIG. 3 above.

Plot 64 (no polarization diversity) and plot 68 (exact calculation of Equation 16) are reproduced in FIG. 4 again as a reference. In addition, a plot 72 shows the clock tone strength when approximated using Equation 18; and a plot 76 shows the clock tone strength when approximated using Equation 19. As seen, the approximations of Equations 18 and 19 do introduce some dependency on polarization rotation angle, but the dependency is sufficiently weak to ensure that the estimated clock tone never diminishes to zero. As such, the approximations of Equations 18 and 19 provide a good trade-off between performance and computational complexity.

Figure 5:
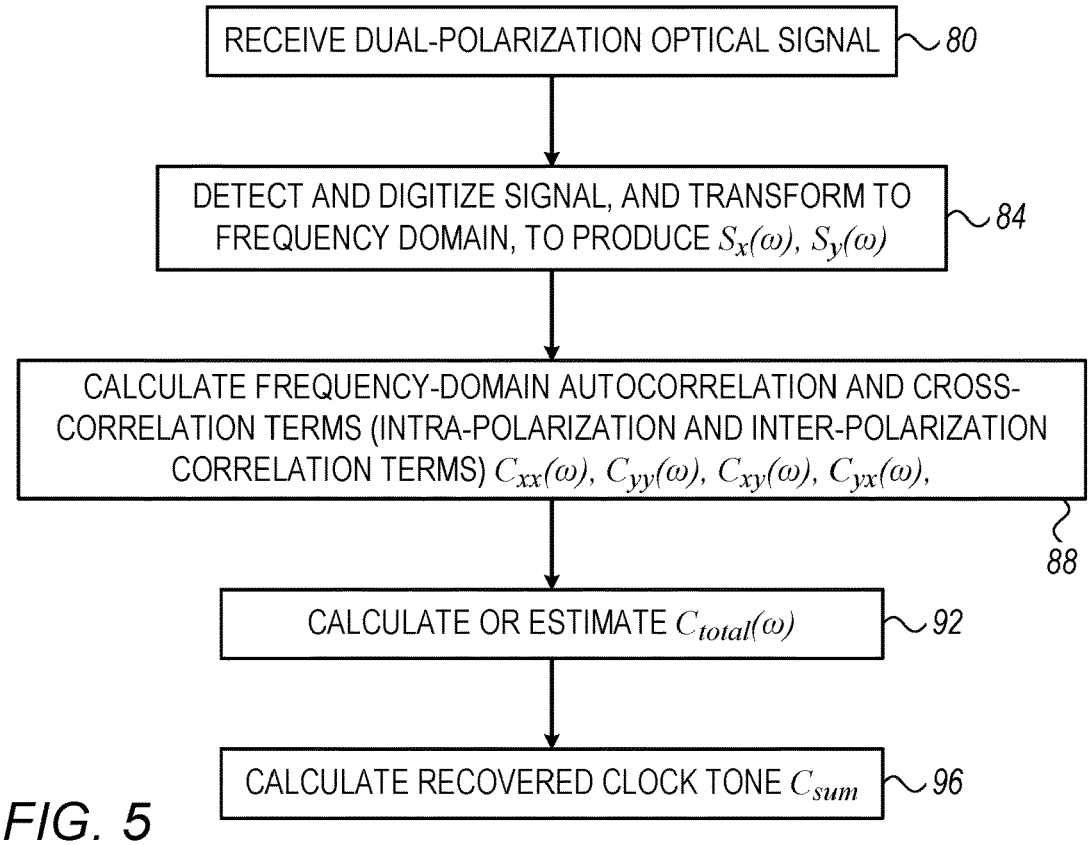
FIG. 5 is a flow chart that schematically illustrates a method for clock tone detection, in accordance with an embodiment that is described herein.

FIG. 5 is a flow chart that schematically illustrates a method for clock tone detection, in accordance with an embodiment that is described herein. The method begins with optical front end 24 of receiver 20 receiving a dual-polarization optical signal, at a reception operation 80. At a detection, digitization and transforming operation 84, the following operations are performed:

- Optical front end 24 converts the optical signal into the analog baseband electrical signals $S_{xi}(t)$, $S_{xq}(t)$, $S_{yi}(t)$ and $S_{yq}(t)$.
- ADCs 32 digitize the analog baseband electrical signals to produce respective digital baseband electrical signals.
- Digital front end 36 pre-processes the digital baseband electrical signals to produce the two complex digital signals $S_x(t)$ and $S_y(t)$.

FFT circuit 40 transforms signals $S_x(t)$ and $S_y(t)$ into digital frequency-domain signals $S_x(\omega)$ and $S_y(\omega)$, respectively.

At a correlation calculation operation 88, clock detector 52 calculates the frequency-domain autocorrelation terms $C_{xx}(\omega)$ and $C_{yy}(\omega)$ (also referred to as intra-polarization correlation terms) and the frequency-domain cross-correlation terms $C_{xy}(\omega)$ and $C_{yx}(\omega)$ (also referred to as inter-polarization correlation terms).

At a diversity combining operation 92, clock detector 52 calculates or approximates $C_{total}(\omega)$, e.g., using an exact calculation in accordance with Equation 16 or using an approximation in accordance with Equation 18 or 19. At a summing operation 96, clock detector 52 sums $C_{total}(\omega)$ over multiple frequencies and takes the absolute value of the sum (e.g., in accordance with Equation 17), to obtain the estimated amplitude $C_{sum}$ of the clock tone.

Figure 6:
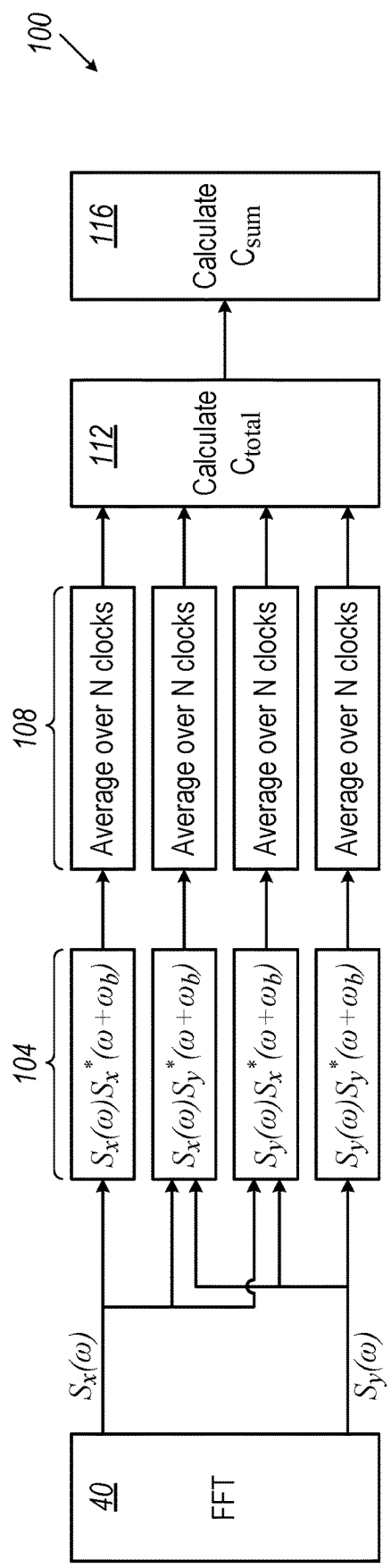
FIGS. 6 and 7 are block diagrams that schematically illustrate example implementations of a clock detector, in accordance with embodiments that are described herein.

FIG. 6 is a block diagram that schematically illustrates a clock detector 100, in accordance with an embodiment that is described herein. The configuration of FIG. 6 can be used to implement clock detector 52 in receiver 20 (FIG. 1). Clock detector 100 comprises four correlators 104, four respective averaging blocks 108, a diversity combiner 112 and a summing block 116.

Correlators 104 receive signals $S_x(\omega)$ and $S_y(\omega)$ from FFT circuit 40. For each frequency $\omega$ in the range of 2 L+1 frequencies (FIG. 2), correlators 104 calculate four respective correlation terms:

$$C_{xx}(\omega) = S_x(\omega) S_x^*(\omega + \omega_b) \quad \text{Equation 20:}$$

$$C_{yy}(\omega) = S_y(\omega) S_y^*(\omega + \omega_b) \quad \text{Equation 21:}$$

$$C_{xy}(\omega) = S_x(\omega) S_y^*(\omega + \omega_b) \quad \text{Equation 22:}$$

$$C_{yx}(\omega) = S_y(\omega) S_x^*(\omega + \omega_b) \quad \text{Equation 23:}$$

The output of each correlator 104 is provided to a respective averaging block 108. Each averaging block 108 averages the respective correlation term over N clock cycles, to produce an estimate of the long-time average (and thus of the expectancy) of the correlation term.

Diversity combiner 112 calculates (or approximates) $C_{total}(\omega)$ for each frequency $\omega$. Any of Equations 16, 18 and 19 can be used for this purpose. Summing block 116 then calculates $C_{sum}$ based on the $C_{total}(\omega)$ values according to Equation 17.

Figure 7:
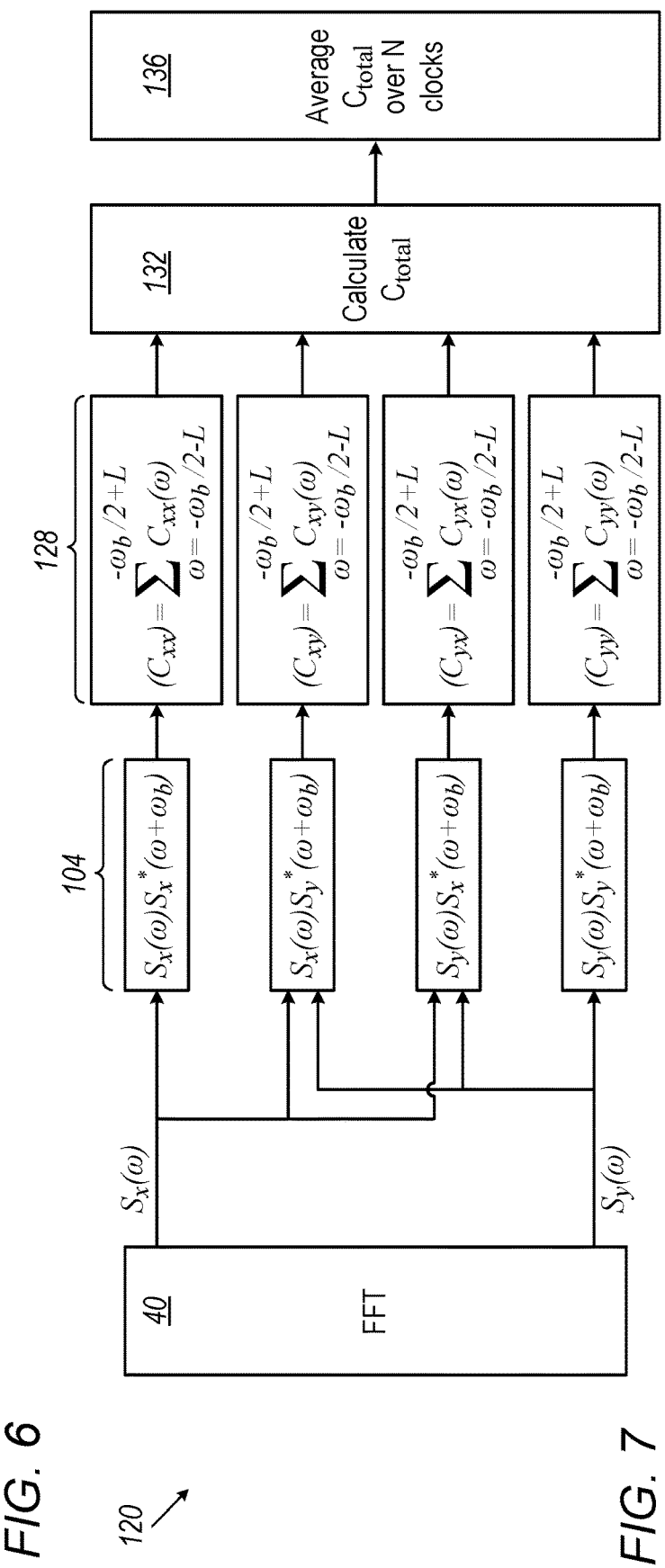

FIG. 7 is a block diagram that schematically illustrates a clock detector 120, in accordance with another embodiment that is described herein. This configuration, too, can be used to implement clock detector 52 of receiver 20. Clock detector 120 comprises four correlators 104, four corresponding summing blocks 128, a diversity combiner 132 and an averaging block 136.

The initial operations of clock detector 120 are similar to those of clock detector 100 of FIG. 6: Correlators 104 receive signals $S_x(\omega)$ and $S_y(\omega)$ from FFT circuit 40. For each frequency $\omega$ in the range of 2 L+1 frequencies (FIG. 2), correlators 104 calculate four respective correlation terms according to Equations 20-23.

In the configuration of FIG. 7, in contrast to FIG. 6, the correlation terms are first summed over frequency, and only then diversity-combined and averaged over time. As seen in the figure, each summing block 128 sums a respective correlation term over the set of frequencies $\omega$ in the range of 2 L+1 frequencies, according to Equations 24-27 below:

$$\langle C_{xx} \rangle = \sum_{\omega=-\omega_b/2-L}^{-\omega_b/2+L} C_{xx}(\omega) \quad \text{Equation 24}$$

$$\langle C_{yy} \rangle = \sum_{\omega=-\omega_b/2-L}^{-\omega_b/2+L} C_{yy}(\omega) \quad \text{Equation 25}$$

$$\langle C_{xy} \rangle = \sum_{\omega=-\omega_b/2-L}^{-\omega_b/2+L} C_{xy}(\omega) \quad \text{Equation 26}$$

$$\langle C_{yx} \rangle = \sum_{\omega=-\omega_b/2-L}^{-\omega_b/2+L} C_{yx}(\omega) \quad \text{Equation 27}$$

Diversity combiner 132 calculates (or approximates) $C_{total}$ based on the four outputs of summing blocks 128. Any of Equations 28-30 below can be used, Equation 28 being an exact calculation and Equations 29 and 30 being approximations:

$$C_{total} = |\langle C_{xx} \rangle + \langle C_{yy} \rangle|^2 + \quad \text{Equation 28}$$
$$|\langle C_{xx} \rangle - \langle C_{yy} \rangle|^2 + |\langle C_{xy} \rangle + \langle C_{yx} \rangle|^2 + |\langle C_{xy} \rangle - \langle C_{yx} \rangle|^2$$

$$C_{total} = |\langle C_{xx} \rangle + \langle C_{yy} \rangle| + \quad \text{Equation 29}$$
$$|\langle C_{xx} \rangle - \langle C_{yy} \rangle| + |\langle C_{xy} \rangle + \langle C_{yx} \rangle| + |\langle C_{xy} \rangle - \langle C_{yx} \rangle|$$

$$C_{total} = \max(|\langle C_{xx} \rangle + \langle C_{yy} \rangle|, \quad \text{Equation 30}$$
$$|\langle C_{xx} \rangle - \langle C_{yy} \rangle|, |\langle C_{xy} \rangle + \langle C_{yx} \rangle|, |\langle C_{xy} \rangle - \langle C_{xy} \rangle|)$$

Equations 28-30 are similar to Equations 16, 18 and 19 above, respectively, except that the former use time-averaged correlation terms instead of raw correlation terms. Note that in the embodiment of FIG. 7, $C_{total}$ is not a function of frequency.

Finally, averaging block 136 averages multiple values of $C_{total}$ to improve estimation accuracy in the presence of noise. The resulting average is an estimate of the clock tone amplitude.

The description up to this point referred mainly to obtaining the amplitude of the clock tone from the received signal. In some applications, e.g., for adjusting the sampling phase of ADCs 32 by feedback control circuit 56 (FIG. 1), it is also necessary to estimate the phase of the clock tone. In various embodiments, the clock tone detector may use various techniques for estimating the phase of the clock tone.

For example, when using the configuration of FIG. 6, clock tone detector 100 may estimate the phase of the clock tone by calculating:

$$C_{total}(\omega) = \text{Im}\{[C_{xx}(\omega) + C_{yy}(\omega)]^2 + [C_{xx}(\omega) - C_{yy}(\omega)]^2 + \quad \text{Equation 31}$$
$$[C_{xy}(\omega) + C_{yx}(\omega)]^2 + [C_{xy}(\omega) - C_{yx}(\omega)]^2\}$$

wherein the Im operator denotes the imaginary part of a complex value. As another example, when using the configuration of FIG. 7, clock tone detector 120 may estimate the phase of the clock tone by calculating:

$$C_{total} = \text{Im}\{[\langle C_{xx}\rangle + \langle C_{yy}\rangle]^2 + [\langle C_{xx}\rangle - \langle C_{yy}\rangle]^2 + [\langle C_{xy}\rangle + \langle C_{yx}\rangle]^2 + [\langle C_{xy}\rangle - \langle C_{yx}\rangle]^2\} \quad \text{Equation 32}$$

Equations 31 and 32 are modified versions of Equations 16 and 28, respectively.

The configurations of receiver 20 and its various components, such as clock detectors 52, 100 and 120, as shown in FIGS. 1, 6 and 7, are example configurations that are depicted solely for the sake of clarity. In alternative embodiments, any other suitable configurations can be used. The different elements of receiver 20 and its various components, such as clock detectors 52, 100 and 120, may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of receiver 20, such as clock detector 52, 100 or 120, may be implemented in software and/or using a combination of hardware and software elements. Elements that are not mandatory for understanding of the disclosed techniques have been omitted from the figure for the sake of clarity.

In some embodiments, some functions of the disclosed receivers, e.g., functions of clock detector 52, 100 or 120, may be implemented in one or more programmable processors, e.g., one or more Central Processing Units (CPUs), microcontrollers and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address clock tone detection in coherent optical receivers, the methods and systems described herein can also be used in other applications, such as in any other system or application that involves a polarization-multiplexed signal, such as in various Radio-Frequency (RF) and optical communication systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A receiver, comprising:
an optical front-end, configured to receive an optical signal comprising a first optical signal component having a first polarization and a second optical signal component having a second polarization, different from the first polarization, the first optical signal component and the second optical signal component being modulated with symbols at a symbol rate; and
digital circuitry, configured to derive a first digital signal representing the first optical signal component having the first polarization, and derive a second digital signal representing the second optical signal component having the second polarization,
the digital circuitry comprising a clock detector configured to:
calculate correlation terms comprising (i) a first autocorrelation of the first digital signal, (ii) a second autocorrelation of the second digital signal, (iii) a first cross-correlation between the first digital signal and the second digital signal, and (iv) a second cross-correlation between the second digital signal and the first digital signal, the correlation terms being calculated in a frequency-domain with a frequency offset commensurate with the symbol rate; and
recover a clock signal of the symbols by (i) summing selected pairs of the correlation terms, and (ii) calculating or estimating a sum-of-squares of the summed pairs.

2. The receiver according to claim 1, wherein, by estimating the sum of squares, the clock detector is configured to prevent the recovered clock signal from diminishing to zero for any combination of Polarization Mode Dispersion (PMD), polarization rotation and Differential Group Delay (DGD) affecting the optical signal.

3. The receiver according to claim 1, wherein the clock detector is configured to recover the clock signal by averaging the sum-of-squares over a plurality of frequencies.

4. The receiver according to claim 1, wherein the clock detector is configured to approximate squares of the summed pairs by calculating absolute-values of the summed pairs.

5. The receiver according to claim 1, wherein the clock detector is configured to approximate the sum-of-squares by:
calculating respective absolute-values of the summed pairs of the correlation terms; and
taking a maximum of the absolute-values.

6. The receiver according to claim 1, wherein, in recovering the clock signal, the clock detector is configured to recover an amplitude of the clock signal by summing the sum-of-squares over a plurality of frequencies.

7. The receiver according to claim 6, wherein the clock detector is configured to average each of the correlation terms over time, per frequency among the plurality of frequencies, then calculate the sum-of-squares per frequency based on the averaged correlation terms, and then calculate the amplitude of the clock signal based on the sum-of-squares calculated per frequency.

8. The receiver according to claim 6, wherein the clock detector is configured to sum each of the correlation terms over the plurality of frequencies, then calculate the sum-of-squares based on the correlation terms summed over the frequencies, and then average multiple sums-of-squares to produce the amplitude of the clock signal.

9. The receiver according to claim 1, wherein the clock detector is further configured to recover a phase of the clock signal by taking an imaginary part of the calculated or estimated sum-of-squares.

10. A method for clock recovery, comprising:
receiving an optical signal comprising a first optical signal component having a first polarization and a second optical signal component having a second polarization, different from the first polarization, the first optical signal component and the second optical signal component being modulated with symbols at a symbol rate;

deriving a first digital signal representing the first optical signal component having the first polarization, and deriving a second digital signal representing the second optical signal component having the second polarization;

calculating correlation terms comprising (i) a first autocorrelation of the first digital signal, (ii) a second autocorrelation of the second digital signal, (iii) a first cross-correlation between the first digital signal and the second digital signal, and (iv) a second cross-correlation between the second digital signal and the first digital signal, the correlation terms being calculated in a frequency-domain with a frequency offset commensurate with the symbol rate; and recovering a clock signal of the symbols by (i) summing selected pairs of the correlation terms, and (ii) calculating or estimating a sum-of-squares of the summed pairs.

11. The method for clock recovery according to claim 10, wherein estimating the sum of squares comprises preventing the recovered clock signal from diminishing to zero for any combination of Polarization Mode Dispersion (PMD), polarization rotation and Differential Group Delay (DGD) affecting the optical signal.

12. The method for clock recovery according to claim 10, wherein recovering the clock signal comprises averaging the sum-of-squares over a plurality of frequencies.

13. The method for clock recovery according to claim 10, wherein estimating the sum-of-squares comprises approximating squares of the summed pairs by calculating absolute-values of the summed pairs.

14. The method for clock recovery according to claim 10, wherein estimating the sum-of-squares comprises:
    calculating respective absolute-values of the summed pairs of the correlation terms; and
    taking a maximum of the absolute-values.

15. The method for clock recovery according to claim 10, wherein recovering the clock signal comprises recovering an amplitude of the clock signal by summing the sum-of-squares over a plurality of frequencies.

16. The method for clock recovery according to claim 15, wherein recovering the amplitude of the clock signal comprises averaging each of the correlation terms over time, per frequency among the plurality of frequencies, then calculating the sum-of-squares per frequency based on the averaged correlation terms, and then calculating the amplitude of the clock signal based on the sum-of-squares calculated per frequency.

17. The method for clock recovery according to claim 15, wherein recovering the amplitude of the clock signal comprises summing each of the correlation terms over the plurality of frequencies, then calculating the sum-of-squares based on the correlation terms summed over the frequencies, and then averaging multiple sums-of-squares to produce the amplitude of the clock signal.

18. The method for clock recovery according to claim 10, wherein recovering the clock signal further comprises recovering a phase of the clock signal by taking an imaginary part of the calculated or estimated sum-of-squares.

* * * * *